US010183647B2

United States Patent
Ishikawa et al.

(10) Patent No.: US 10,183,647 B2
(45) Date of Patent: Jan. 22, 2019

(54) VEHICLE SEATBELT BUCKLE ASSEMBLY AND METHOD

(71) Applicant: Honda Motor Co., Ltd., Tokyo (JP)

(72) Inventors: Tetsuya Ishikawa, Dublin, OH (US); Jesus A. Diaz Gonzalez, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 15/350,148

(22) Filed: Nov. 14, 2016

(65) Prior Publication Data

US 2018/0134250 A1 May 17, 2018

(51) Int. Cl.
*B60R 22/26* (2006.01)
*B60R 22/20* (2006.01)
*B60N 2/68* (2006.01)
*B60R 22/18* (2006.01)

(52) U.S. Cl.
CPC .............. *B60R 22/26* (2013.01); *B60R 22/20* (2013.01); *B60N 2/688* (2013.01); *B60R 2022/1806* (2013.01); *B60R 2022/207* (2013.01)

(58) Field of Classification Search
CPC ......... B60R 22/03; B60R 22/20; B60R 22/26; B60R 2022/021; B60R 2022/1806; B60R 2022/207; B60N 2/10; B60N 2/20; B60N 2/30; B60N 2/3002; B60N 2/3004; B60N 2/3009; B60N 2/688
See application file for complete search history.

(56) References Cited

U.S. PATENT DOCUMENTS

| 2,964,100 | A | * | 12/1960 | McCall | ............... B60R 22/3405 |
| | | | | | 297/474 |
| 3,576,346 | A | * | 4/1971 | Hutchinson | ............. B60R 22/02 |
| | | | | | 297/481 |
| 3,583,764 | A | | 6/1971 | Lohr et al. | |
| 3,606,454 | A | | 9/1971 | Dorn | |
| 3,841,658 | A | * | 10/1974 | Singh | ................. A44B 11/2507 |
| | | | | | 297/474 |
| 4,810,037 | A | * | 3/1989 | Takagi | .................... B60R 22/02 |
| | | | | | 297/113 |

(Continued)

FOREIGN PATENT DOCUMENTS

| GB | 2415165 A | * | 12/2005 | ........... B60N 2/3009 |
| JP | 10315910 A | * | 12/1998 | ............... B60N 2/58 |

(Continued)

*Primary Examiner* — Laura Freedman
(74) *Attorney, Agent, or Firm* — Rankin, Hill & Clark LLP

(57) ABSTRACT

A seatbelt buckle assembly and method for a vehicle includes a buckle housing moveable between a fixed presentation state wherein the buckle housing is presented in a fixed position for receipt of an associated seatbelt tongue member and a loose flexible state wherein the buckle housing is at least pivotable for moving laterally within the vehicle. The seatbelt buckle assembly further includes a seat cushion defining a buckle aperture through which the buckle housing is received. The buckle housing is slidable in a first direction into the buckle aperture to move the buckle housing into the fixed presentation state and slidable in a second direction outward away from the buckle aperture to move the buckle housing into the loose flexible state. The second direction is opposite the first direction.

18 Claims, 4 Drawing Sheets

(56) References Cited

U.S. PATENT DOCUMENTS

| | | | |
|---|---|---|---|
| 5,044,695 A * | 9/1991 | Tsuchiya | B60R 22/02 |
| | | | 297/188.04 |
| 5,064,220 A * | 11/1991 | Ogawa | B60R 22/26 |
| | | | 180/268 |
| 5,131,682 A | 7/1992 | Reed | |
| 5,248,356 A | 9/1993 | Shimada | |
| 5,951,112 A * | 9/1999 | Hansson | B60R 22/00 |
| | | | 280/801.1 |
| 6,581,969 B2 * | 6/2003 | Nishide | B60R 22/22 |
| | | | 280/801.1 |
| 7,063,390 B2 | 6/2006 | Suzuki et al. | |
| 7,229,135 B2 * | 6/2007 | Hyatt | B60R 22/22 |
| | | | 297/481 |
| 7,648,208 B2 | 1/2010 | Weinstein et al. | |
| 7,775,557 B2 | 8/2010 | Boström et al. | |
| 7,845,734 B2 * | 12/2010 | Gomi | B60R 22/26 |
| | | | 280/801.1 |
| 8,215,716 B2 | 7/2012 | Akaike et al. | |
| 8,302,994 B2 | 11/2012 | Ko | |
| 8,434,828 B2 | 5/2013 | Arata et al. | |
| 8,727,449 B2 | 5/2014 | Laframboise et al. | |
| 2004/0207245 A1 | 10/2004 | Baylis | |
| 2006/0231317 A1 | 10/2006 | Yamaguchi et al. | |
| 2009/0094807 A1 * | 4/2009 | Sugimoto | B60R 22/03 |
| | | | 24/589.1 |
| 2017/0259777 A1 * | 9/2017 | Shimizu | B60R 22/20 |

FOREIGN PATENT DOCUMENTS

| | | | | |
|---|---|---|---|---|
| JP | 11124006 A | * | 5/1999 | |
| JP | 2001163177 A | * | 6/2001 | |
| JP | 2002301975 A | * | 10/2002 | |
| JP | 2008044515 A | * | 2/2008 | |
| JP | 2010089686 A | * | 4/2010 | |
| JP | 2010215152 A | * | 9/2010 | |
| JP | 2011105149 A | * | 6/2011 | |
| JP | 2012121511 A | * | 6/2012 | |
| JP | 2012126165 A | * | 7/2012 | |
| JP | 2015013555 A | * | 1/2015 | |

* cited by examiner

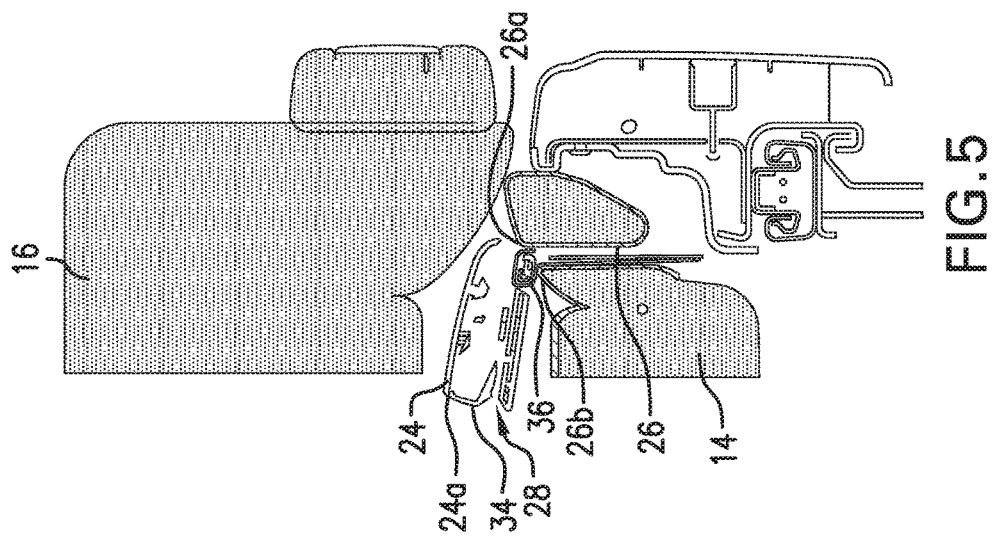
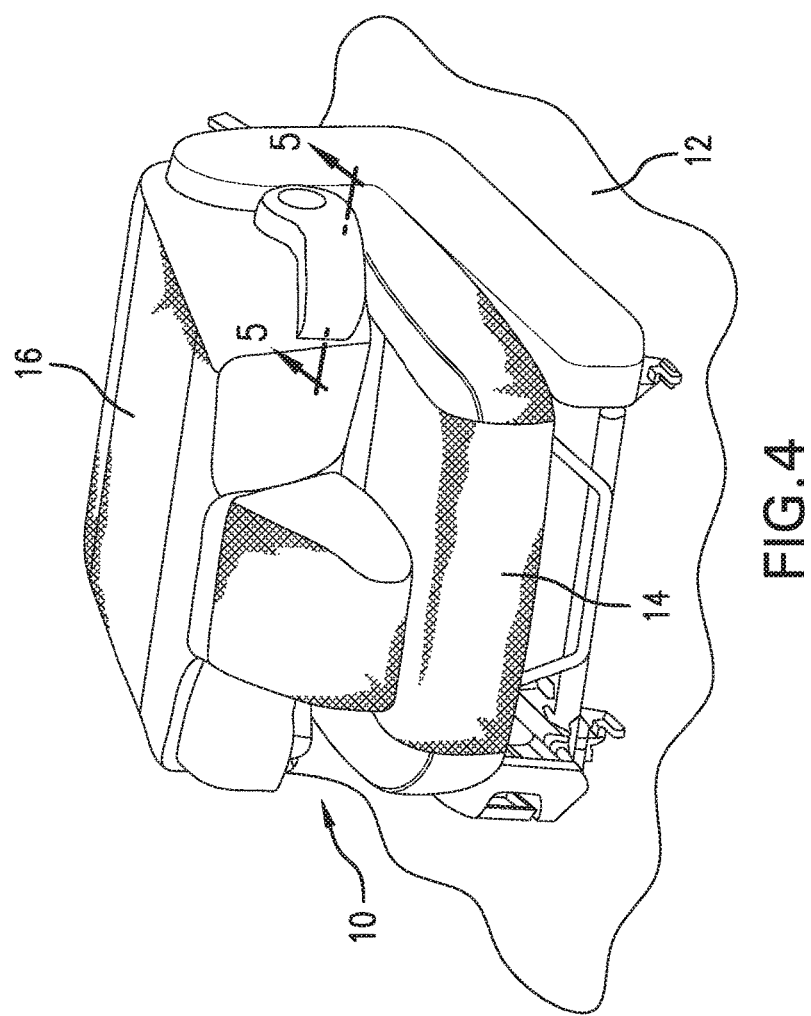

VEHICLE SEATBELT BUCKLE ASSEMBLY AND METHOD

BACKGROUND

Modern seatbelts for vehicles include a seatbelt tongue member secured to a webbing that can be pulled out across a vehicle occupant's lap and shoulder. The tongue member is releasably securable to a buckle assembly typically provided on a seat base of a vehicle seat assembly. To make seatbelts easier to use, many vehicle manufacturers apply a buckle boot to the buckle assembly to fix the position of the buckle assembly and thereby make it easier for a user to insert the corresponding tongue member into the buckle assembly. In particular, the buckle boot fixes and inhibits movement of the buckle assembly so the user can insert the tongue member therein with only a single hand. Specifically, the buckle boot is received around at least a lower portion of the seatbelt buckle assembly and a flexible webbing that attaches to the lower end of the seatbelt buckle assembly to the vehicle body. The buckle boot generally inhibits or prevents lateral movement of the seatbelt buckle assembly relative to the webbing and/or relative to the vehicle seat in which the buckle assembly is provided.

Similarly, some vehicle manufacturers use hard stays to fix the location of the buckle housing. The hard stay is a rigid bracket that fixes the location of the buckle assembly relative to the vehicle seat to again enable easier insertion of the tongue member therein. Sometimes, the hard stay will allow for forward and backward pivotal movement. That is, pivotal movement about an axis generally laterally disposed across the width of the vehicle.

Drawbacks associated with the use of the buckle boot and the hard stay include the extra cost to the vehicle manufacturer when supplying these components. Also, in some vehicle seat assemblies, the fixed buckle boot tends to mark the vehicle seat, such as when the seat back is folded relative to the seat base. In particular, the fixed buckle assembly may engage and press into the seat back as the seat back is pivoted relative to the seat base and leave a marking (e.g., roughened score mark, a permanent indentation, etc.) on the seat back, such as along a lateral portion of the seat back.

SUMMARY

According to one aspect, a seatbelt buckle assembly for a vehicle includes a buckle housing moveable between a fixed presentation state wherein the buckle housing is presented in a fixed position for receipt of an associated seatbelt tongue member and a loose flexible state wherein the buckle housing is at least pivotable for moving laterally within the vehicle. The seatbelt buckle assembly further includes a seat cushion defining a buckle aperture through which the buckle housing is received. The buckle housing is slidable in a first direction into the buckle aperture to move the buckle housing into the fixed presentation state and slidable in a second direction outward away from the buckle aperture to move the buckle housing into the loose flexible state. The second direction is opposite the first direction.

According to another aspect, a vehicle seatbelt buckle assembly includes a vehicle seat defining a buckle aperture and a bootless buckle housing secured to a either a vehicle seat frame member or a vehicle body member through the buckle aperture. The buckle housing is movable between a fixed presentation state wherein the buckle housing is at least partially inserted into the buckle aperture and held by the vehicle seat in a fixed position and a loose flexible state wherein the buckle housing is at least partially removed from the buckle aperture at least relative to the fixed presentation state.

According to a further aspect, a seatbelt buckle method for a vehicle includes providing a buckle housing in association with a vehicle seat, wherein the vehicle seat defines a buckle aperture through which the buckle housing is received and/or secured to the vehicle seat or a body portion of the vehicle; moving the buckle housing in a first direction into the buckle aperture to place the buckle housing in a fixed presentation state wherein the buckle housing is presented in a fixed position for receipt of an associated seatbelt tongue member; and moving the buckle housing in a second, opposite direction outward away from the buckle housing into a loose flexible state wherein the buckle housing is pivotable for moving laterally relative to the buckle aperture.

BRIEF DESCRIPTION OF THE DRAWINGS

FIG. 4 is another perspective view of the vehicle seat, but showing a seat back of the vehicle seat assembly folded down onto a seat base of the vehicle seat assembly.

FIG. 5 is a schematic cross-section view taken along the line 5-5 of FIG. 4 and shows the buckle housing in a loose flexible state wherein the buckle housing is at least pivotable for moving laterally within the vehicle, such as to be folded down laterally onto the seat base.

DETAILED DESCRIPTION

Figure 1:
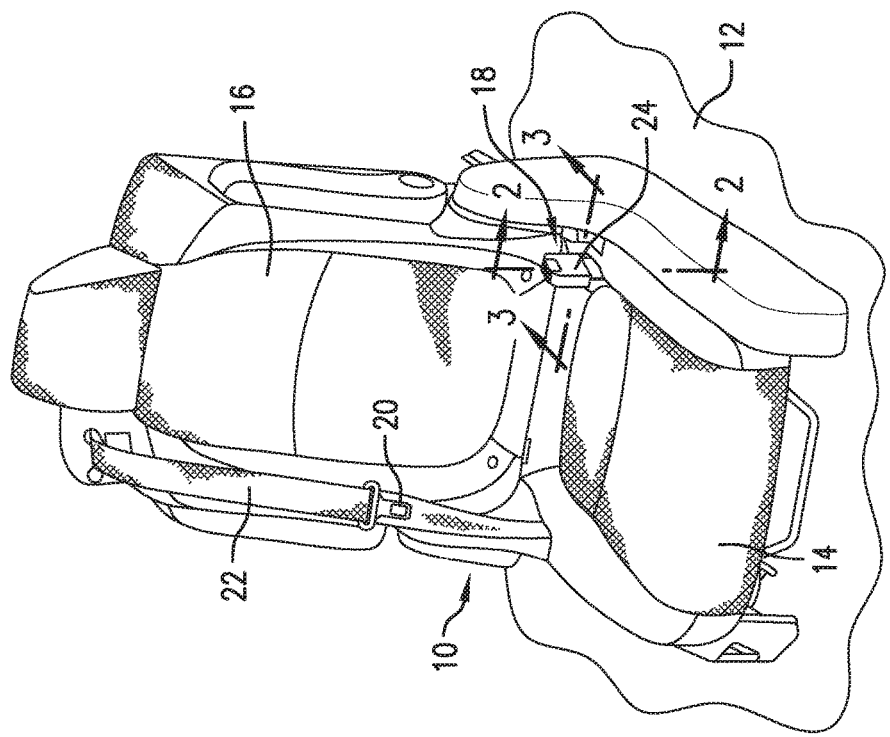
FIG. 1 is a perspective view of a vehicle seat assembly having a seatbelt buckle assembly provided therewith that is shown in a fixed presentation state.

Referring now to the drawings wherein the showings are for purposes of illustrating one or more exemplary embodiments only and not for purposes of limiting the same, FIG. 1 generally illustrates a vehicle seat assembly 10 provided in a vehicle 12. The vehicle seat assembly 10, also referred to herein simply as a vehicle seat, includes a seat cushion or base 14 mounted to the vehicle 12 and a seat back 16 extending upward from the seat base 14. A seatbelt assembly comprised of a seatbelt buckle assembly 18, a seatbelt tongue member 20, and a shoulder and lap belt 22 is provided in association with the vehicle seat 10. As is understood by those skilled in the art, the tongue member 20 of the seatbelt assembly is releasable latchable into the buckle assembly 18 so as to secure an occupant via the belt 22 into the seat assembly 10.

With additional reference to FIGS. 2-5, the vehicle seatbelt buckle assembly 18 includes a bootless buckle housing 24 movable between a fixed presentation state (shown in FIGS. 1-3) wherein the buckle housing 24 is presenting in a fixed position for receipt of the seatbelt tongue member 20 and a loose flexible state (shown best in FIG. 5) wherein the buckle housing 24 is at least pivotable for moving laterally within the vehicle 12. The seatbelt buckle assembly 18 can also include the vehicle seat 10, and particularly the seat cushion 14 of the vehicle seat 10. The seat cushion 14 defines a buckle aperture 26 (shown in isolation in FIG. 6) through which the buckle housing 24 is received.

Figure 2:
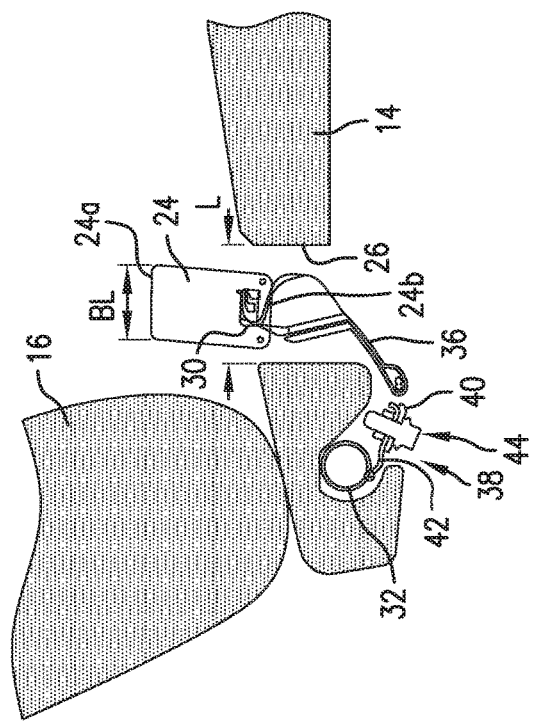
FIG. 2 is a schematic cross-section view taken along the line 2-2 of FIG. 1.
Figure 3:
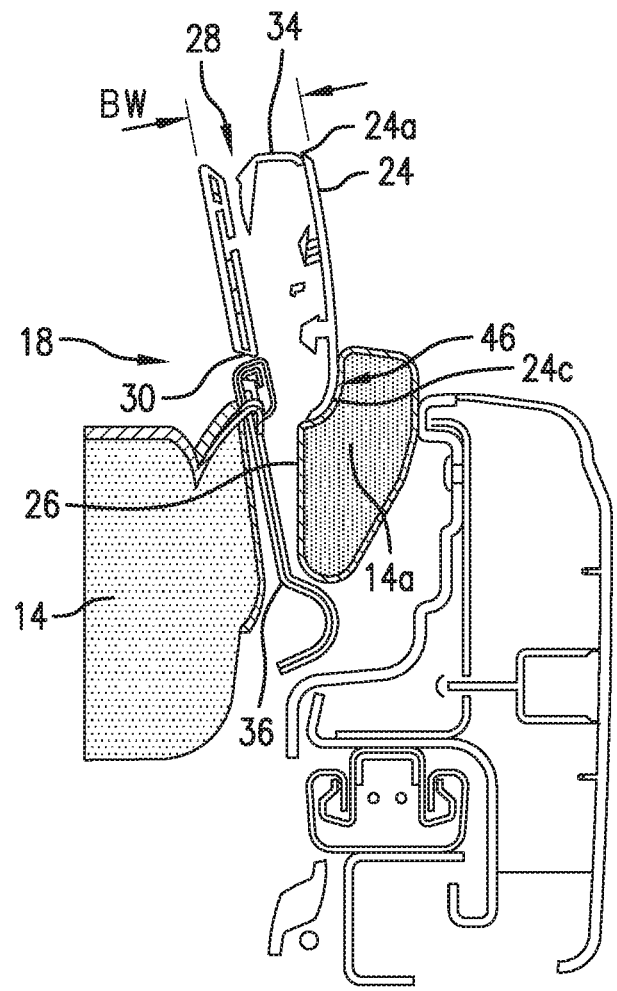
FIG. 3 is a schematic cross-section view taken along the line 3-3 of FIG. 1.

As will be described in more detail below, the buckle housing 24 is slidable in a first direction into the buckle aperture 26 to move the buckle housing 24 into the fixed presentation state of FIGS. 1-3 and is slidable in a second direction outward away from the buckle aperture 26 to move the buckle housing 24 into the loose flexible state shown in FIG. 5. Thus, the second direction, which is outward away from the buckle aperture 26, is opposite the first direction, which is into the buckle aperture 26. As shown in FIGS. 1-3, in the fixed presentation state, the buckle housing 24 is at least partially inserted into the buckle aperture 26 and held by the vehicle seat 10, and particularly the seat base 14 thereof, in the fixed position. As shown in FIG. 5, in the loose flexible state, the buckle housing 24 is at least partially removed from the buckle aperture 26, at least relative to the fixed presentation state.

The buckle housing 24 defines a distal aperture 28 in an end face 24a thereof for receipt of the tongue member 20 and defines a proximal aperture 30 spaced apart from the end face 24a for securing the buckle housing 24 to either, or both, a vehicle seat frame member 32 (as shown in FIG. 2) of the vehicle seat 10 or a body member of the vehicle 12 to which the vehicle seat 10 is secured. The proximal aperture 30 can also be referred to as a web aperture and is disposed at or adjacent a proximal end 24b of the buckle housing 24. As is known and understood by those skilled in the art, a release button actuator 34 is provided in the distal aperture 28 of the end face 24a for selectively releasing the latching engagement of the tongue member 20 when received and releasable secured to the buckle housing 24. A webbing 36 is received through the proximal aperture 30 and the buckle housing 24 is pivotally movable, at least laterally, relative to the webbing 36 when the buckle housing 24 is in the loose flexible state (i.e., the buckle housing 24 is pivotally attached to the webbing 36). In contrast, the buckle housing 24 is generally fixed relative to the webbing 36 when the buckle housing 24 is in the fixed presentation state.

The webbing 36 secures the buckle housing 24 to a seatbelt bracket or bracket assembly 38 that is fixedly mounted to the vehicle seat frame member 32 of the vehicle 12. Thus, the buckle housing 24 is secured to the vehicle seat frame member 32 via the webbing 36 and the bracket assembly 38. In the illustrated embodiment, with reference specifically to FIG. 2, the seatbelt bracket assembly 38 includes a first member 40 to which the webbing 36 is secured and a second member 42 welded to the vehicle seat frame member 32. A fastener or fastener assembly 44 secures the first member 40 to the second member 42 and thereby secures the webbing 36 to the vehicle seat frame member 32. Of course, other arrangements could be employed, including for example the use of a single piece bracket in place of the members 40, 42 and the fastener assembly 44.

Figure 6:
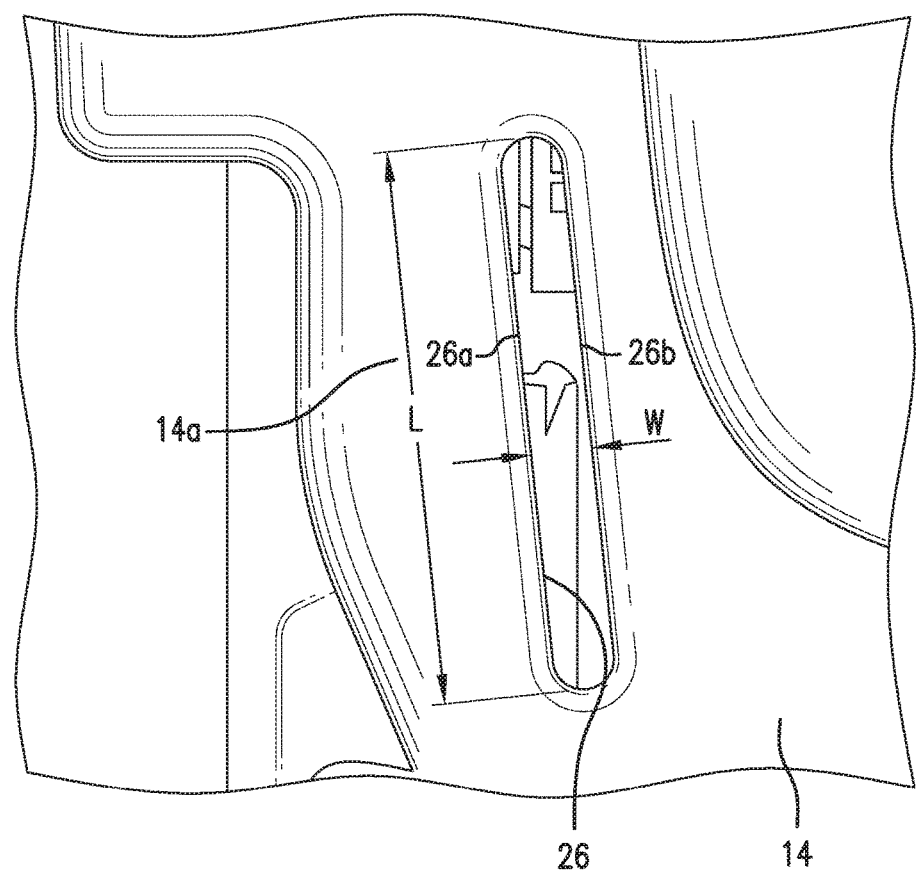
FIG. 6 is a partial plan view showing a portion of the seat base defining a buckle aperture therein through which the buckle housing is received, though the buckle housing is removed from FIG. 6.

With reference to FIG. 6, the buckle aperture 26 has an elongated narrow slit or channel shape that may have a continuous perimeter that is uninterrupted by slits or channels. In particular, in the illustrated embodiment, the buckle aperture 26 has an elongated length L and a narrow width W, wherein the elongated length L is about 8-10 times greater than the width W. By way of a non-limiting example, the elongated length L can be 84 mm and the width W can be 9 mm. As best shown in FIG. 2, the elongated length L is longer or greater than an elongated buckle length BL of the buckle housing 24 to allow for the buckle housing 24 to be moved longitudinally relative to a direction of travel for the vehicle 12. That is, the buckle housing 24 can freely move along the elongated length L of the buckle aperture 26.

At least a portion of the seat base or cushion 14 defining the buckle aperture 26 can be resilient or resiliently formed to enable the buckle housing 24 to be received within the buckle aperture 26 when a buckle housing 24 is moved from the loose flexible state to the fixed presentation state. This is best shown in FIG. 3 wherein an outer lateral portion 14a of the seat base 14 is shown deformed at location 46 where the buckle housing 24 presses into and deforms the seat base 14. Accordingly, the lateral portion 14a may be deformed so that the location 46 engages at least a portion of the proximal end 24b of the buckle housing 24 and an outer side 24c of the buckle housing 24. Therefore, the lateral portion 14a inhibits or otherwise prevents the buckle housing 24 from rotating outwardly or being pushed downwardly through the buckle aperture 26 during insertion of the tongue member 20 into the buckle assembly 18. More particularly, the vehicle seat 10, or at least a portion thereof such as the seat base 14 defining the buckle aperture 26, is resiliently formed to accommodate the buckle housing 24 when in the fixed presentation state. As shown by the deformation illustrated in FIG. 3, the buckle housing 24 has a profile shape larger in size than the buckle aperture 26, particularly in a width-wise direction (i.e., a buckle width BW is greater in size or wider than the width W of the buckle aperture 26), when the buckle aperture 26 is in a normal, non-expanded shape, such as shown in FIGS. 5 and 6.

The buckle housing 24 is pivotable relative to a length direction (i.e., the elongated length L) of the buckle aperture 26 when the buckle housing 24 is in the loose flexible state. In particular, the buckle housing 24 is pivotable so as to move or be movable laterally in the vehicle 12, such as to the folded down position shown in FIG. 5, when in the loose flexible state. Thus, the buckle housing 24 is pivotally movable relative to the webbing 36 when in the loose flexible state and is generally inhibited from pivotable movement, i.e., in a lateral direction across the vehicle width, relative to the webbing 36 when in a fixed presentation state. In particular, in the illustrated embodiment, the buckle housing 24 is pivotally movable to each elongated side of the buckle aperture 26, such as toward the middle of a vehicle seat 10 as shown in FIG. 5 and/or away from the middle of the vehicle seat 10 (not shown). In a non-limiting example, the outer side 26a of the buckle aperture 26 may be raised with respect to the inner side 26b of the buckle aperture 26 to encourage or otherwise bias the buckle housing 26 to pivot or rotate toward the middle of the vehicle seat 10 when moved from the fixed presentation state to the loose flexible state. Specifically, the buckle housing 24 is pivotally movable in this manner to an angle of at least 60° relative to a plane generally parallel to an elongated length of the buckle aperture 26 and generally orthogonal relative to a portion of the vehicle seat 10 adjacent the buckle aperture 26. In the illustrated embodiment, as shown in FIG. 5, the buckle housing 24 is pivotal to nearly 90° relative to the plane generally parallel to the elongated length L of the buckle aperture 26 and generally orthogonal relative to a portion of the vehicle seat 10 adjacent the buckle aperture 26.

Advantageously, the buckle housing 24 can be placed into the fixed presentation state wherein the buckle housing 24 is presented in the fixed position so as to enable easier insertion of the tongue member 20 into the buckle housing 24. This is desirable when an occupant of the vehicle seat 10 is buckling. In particular, like the buckle boot and the hard stay of the prior art described in the Background section above, this enables the occupant to secure the tongue member 20 into the buckle housing 24 while using only one hand. Additionally, in contrast with the prior art, the buckle housing 24 is movable to the loose flexible state wherein the buckle housing 24 is moved out of the buckle aperture 26. This enables the buckle housing 24 to pivot laterally, such as when the seat back 16 is folded down onto the seat base 14 as shown in FIG. 4. Advantageously, such allowed movement for the buckle housing 24 avoids a problem with some known designs wherein a fixed buckle housing inhibits movement of the seat back 16 onto the seat base 14 and/or undesirably marks a lateral side of the seat back. Optionally, the seat base 14, particularly the portion defining the buckle aperture 26, uses an anti-squeak material to eliminate or reduce noises that might otherwise occur due to friction between the buckle housing 24 and the seat base 14.

A vehicle seatbelt buckle method for a vehicle will now be described. In particular, the method will be described in association with the seatbelt buckle assembly 18 described herein above, although this is not required. In the method, the buckle housing 24 is provided in association with the vehicle seat 10. As already discussed, the vehicle seat 10 defines the buckle aperture 26 through which the buckle housing 24 is received and/or secured to a vehicle seat frame member 32 of the vehicle. The buckle housing 24 can be moved in the first direction into the buckle aperture 26 to place the buckle housing 24 in the fixed presentation state wherein the buckle housing 24 is presented in the fixed position for receipt of the associated seatbelt tongue member 20.

The buckle housing 24 is also movable in a second, opposite direction outward and away from the buckle aperture 26 into the loose flexible state wherein the buckle housing 24 is pivotable for moving laterally relative to the buckle aperture 26. As already described herein, moving the buckle housing 24 into the buckle aperture 26 can include compressing the vehicle seat 10 adjacent the buckle aperture 26 (i.e., the seat base, and particularly a portion of the seat base 14 defining the buckle aperture 26) to expand the buckle aperture 26 laterally and to enable the buckle housing 24 to fit within the buckle aperture 26. In the method, the buckle housing 24 can particularly be pivoted about an axis parallel with the elongated length L of the buckle aperture 26 when the buckle housing 24 is in the loose flexible state as best shown in FIG. 5.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A seatbelt buckle assembly for a vehicle, comprising:
a buckle housing movable between a fixed presentation state wherein the buckle housing is presented in a fixed position by engagement with a seat cushion for receipt of an associated seatbelt tongue member and a loose flexible state wherein the buckle housing is at least pivotable for moving laterally relative to the seat cushion within the vehicle; and
the seat cushion defining a buckle aperture through which the buckle housing is received, the buckle housing slidable in a first direction into the buckle aperture compressing the seat cushion adjacent the buckle aperture to expand the buckle aperture enabling the buckle housing to move into the fixed presentation state and slidable in a second direction outward away from the buckle aperture to move the buckle housing into the loose flexible state, the second direction being opposite the first direction.

2. The seatbelt buckle assembly of claim 1 wherein the buckle aperture has an elongated narrow slit shape.

3. The seatbelt buckle assembly of claim 2 wherein the buckle aperture has an elongated length and a narrow width, the elongated length is about 8-10 times greater than the width.

4. The seatbelt buckle assembly of claim 3 wherein at least a portion of the seat cushion defining the buckle aperture is resilient to enable the buckle housing to be received within the buckle aperture when the buckle housing is moved from the loose flexible state to the fixed presentation state.

5. The seatbelt buckle assembly of claim 1 wherein at least a portion of the seat cushion defining the buckle aperture is resilient to enable the buckle housing to be received within the buckle aperture when the buckle housing is moved from the loose flexible state to the fixed presentation state.

6. The seatbelt buckle assembly of claim 1 wherein the buckle housing defines a distal aperture in an end face thereof for receipt of the associated seatbelt tongue member and defines a proximal aperture spaced apart from the end face for securing the buckle housing to a vehicle seat frame member of the vehicle.

7. The seatbelt buckle assembly of claim 6 wherein a webbing is received through the proximal aperture and the buckle housing is pivotally movable relative to the webbing when the buckle housing is in the loose flexible state, and wherein the buckle housing is generally fixed relative to the webbing when the buckle housing is in the fixed presentation state.

8. The seatbelt buckle assembly of claim 7 wherein the webbing secures the buckle housing to a seatbelt bracket that is fixedly mounted to a vehicle seat frame member of the vehicle.

9. The seatbelt buckle assembly of claim 1 wherein the buckle housing is pivotable relative to a length direction of the buckle aperture when the buckle housing is in the loose flexible state.

10. The seatbelt buckle assembly of claim 1 wherein the buckle housing is pivotally attached to a webbing and the webbing is secured to a bracket fixed to a body portion of the vehicle, the buckle housing pivotally movable relative to the webbing when in the loose flexible state and generally inhibited from pivotal movement relative to the webbing when in the fixed presentation state.

11. A vehicle seatbelt buckle assembly, comprising:
a vehicle seat defining a buckle aperture; and
a bootless buckle housing secured to either a vehicle seat frame member or a vehicle body member through the buckle aperture, the buckle housing movable between a fixed presentation state wherein the buckle housing is at least partially inserted into the buckle aperture and held by the vehicle seat in a fixed position for receipt of an associated seatbelt tongue member and a loose flexible state wherein the buckle housing is at least partially removed from the buckle aperture at least relative to the fixed presentation state,
wherein in the loose flexible state the buckle housing is at least pivotable for moving laterally relative to the vehicle seat within the vehicle, wherein the vehicle seat, or at least a portion thereof defining the buckle aperture, is resiliently formed to accommodate the buckle housing when in the fixed presentation state, the buckle housing having a profile shape larger in size than an upper outlet of the buckle aperture when the buckle aperture is in a normal, non-expanded shape.

12. The vehicle seatbelt buckle assembly of claim 11 wherein the buckle housing defines a web aperture at or adjacent a proximal end thereof through which a webbing is received for mounting the buckle housing to the vehicle seat frame member or the vehicle body member.

13. The vehicle seatbelt buckle assembly of claim 12 wherein the buckle housing is pivotally movable relative to the webbing when the buckle housing is in the loose flexible state and the buckle housing is generally inhibited from pivotal movement relative to the webbing when the buckle housing is in the fixed presentation state.

14. The vehicle seatbelt buckle assembly of claim 13 wherein the buckle housing is pivotally movable to each elongated side of the buckle aperture to an angle of at least 60 degrees relative to a plane generally parallel to an elongated length of the buckle aperture and generally orthogonal relative to a portion of the vehicle seat adjacent the buckle aperture.

15. The vehicle seatbelt buckle assembly of claim 11 wherein the buckle aperture is shaped as a slit having an elongated length and a narrow width.

16. The vehicle seatbelt buckle assembly of claim 15 wherein the elongated length is about 8-10 times larger than the narrow width.

17. A seatbelt buckle method for a vehicle, comprising:
providing a buckle housing in association with a vehicle seat, wherein the vehicle seat defines a buckle aperture, and the buckle housing is received through the buckle aperture and secured to the vehicle seat or a body member of the vehicle;
moving the buckle housing in a first direction into the buckle aperture to place the buckle housing in a fixed presentation state wherein the buckle housing is presented in a fixed position for receipt of an associated seatbelt tongue member; and
moving the buckle housing in a second, opposite direction outward away from the buckle aperture into a loose flexible state wherein the buckle housing is pivotable for moving laterally relative to the buckle aperture,
wherein moving the buckle housing into the buckle aperture includes compressing the vehicle seat adjacent the buckle aperture to expand the buckle aperture and to enable the buckle housing to fit within the buckle aperture.

18. The seatbelt buckle method of claim 17 further includes:
pivoting the buckle housing about an axis parallel with an elongated length of the buckle aperture when the buckle housing is in the loose flexible state.

* * * * *